(12) United States Patent
Zecchetto (10) Patent No.: US 8,925,949 B2
(45) Date of Patent: Jan. 6, 2015

(54) BICYCLE FRAME

(71) Applicant: Diamant S.r.l., Sorga/Frazione Bonferraro (IT)

(72) Inventor: Philippe Zecchetto, Nogara (IT)

(73) Assignee: Diamant S.R.L. (IT)

( * ) Notice: Subject to any disclaimer, the term of this patent is extended or adjusted under 35 U.S.C. 154(b) by 0 days.

(21) Appl. No.: 13/887,931

(22) Filed: May 6, 2013

(65) Prior Publication Data
US 2013/0300085 A1 Nov. 14, 2013

(30) Foreign Application Priority Data
May 8, 2012 (IT) .............................. BO2012A0253

(51) Int. Cl.
*B62K 19/18* (2006.01)
*B62K 19/00* (2006.01)
*B62K 3/04* (2006.01)
*B62K 19/34* (2006.01)
*B62K 3/02* (2006.01)

(52) U.S. Cl.
CPC . *B62K 19/00* (2013.01); *B62K 3/04* (2013.01); *B62K 19/18* (2013.01); *B62K 19/34* (2013.01); *B62K 3/02* (2013.01)
USPC .......................... 280/281.1; 280/287; 280/288

(58) Field of Classification Search
CPC ............. B62K 3/02; B62K 3/04; B62K 19/06
USPC ...................... 280/281.1, 287, 288
See application file for complete search history.

(56) References Cited

U.S. PATENT DOCUMENTS

| | | | | |
|---|---|---|---|---|
| 4,565,383 A | * | 1/1986 | Isaac | 280/276 |
| 4,889,355 A | * | 12/1989 | Trimble | 280/281.1 |
| 5,080,385 A | * | 1/1992 | Duplessis | 280/281.1 |
| 6,076,845 A | * | 6/2000 | Lawwill et al. | 280/284 |
| 7,114,738 B1 | * | 10/2006 | Chen | 280/281.1 |
| 7,140,628 B2 | * | 11/2006 | Parkin | 280/281.1 |
| 7,195,088 B2 | * | 3/2007 | Matsueda et al. | 180/206.5 |
| 7,967,315 B2 | * | 6/2011 | Soucek et al. | 280/274 |
| 8,448,971 B2 | * | 5/2013 | Giroux | 280/287 |
| 2003/0197346 A1 | | 10/2003 | Singenberger | |

(Continued)

FOREIGN PATENT DOCUMENTS

DE 114797 12/1900

OTHER PUBLICATIONS

IT Appln. No. BO2012A 000253—Oct. 24, 2012 Italian Search Report, Italian Patent and Trademark Office.

*Primary Examiner* — Kevin Hurley
*Assistant Examiner* — Michael Stabley
(74) *Attorney, Agent, or Firm* — Davidson Berquist Jackson & Gowdey LLP (57) ABSTRACT

A bicycle frame comprising a front triangle and a rear triangle. The front triangle comprises, in turn, the following tubular elements: a seat tube; a top tube; a down tube; and a steering tube. Whereas the rear triangle comprises, in turn, the following tubular elements:—two inclined seat stays and two horizontal chain stays. The frame is characterized in that the elements comprised in the front triangle are manufactured as one single piece, and in that the two chain stays are joined to said front triangle by means of a bushing, which is inserted into a seat, which is obtained in correspondence to a bottom bracket axle.

10 Claims, 9 Drawing Sheets

(56) References Cited

U.S. PATENT DOCUMENTS

| | | |
|---|---|---|
| 2008/0100029 A1 | 5/2008 | Hu |
| 2012/0032413 A1* | 2/2012 | Bell et al. ................. 280/264 |
| 2012/0061941 A1* | 3/2012 | Choi et al. ............... 280/281.1 |
| 2012/0169028 A1* | 7/2012 | Lund et al. .............. 280/281.1 |

* cited by examiner

BICYCLE FRAME

The present invention is relative to a bicycle frame of the innovative type.

CROSS REFERENCE TO RELATED APPLICATIONS

The present application claims priority to Italian Appln. No. BO2012A 000253, filed May 8, 2012.

BACKGROUND OF THE INVENTION

It is generally known that a bicycle frame normally comprises a front triangle and a rear triangle.

The front triangle comprises, in turn, the following tubular elements:
- a seat tube;
- a top tube;
- a down tube; and
- a steering tube;

whereas the rear triangle comprises, in turn, the following tubular elements:
- two seat stays, which are integral to the seat tube; and
- two chain stays, which are integral to the seat tube and to the down tube in correspondence to a bottom bracket axle.

It is also generally known that bicycle frames can be manufactured using tubular elements made of different materials, such as steel, aluminium and titanium. Said tubular elements, then, can be assembled adopting assembling methods that are suitable for the materials chosen.

For example, steel is easy to be processed and repaired at low costs, but it is very heavy. Furthermore, steel is easily oxidable and, therefore, high-quality tubes must be subject to suitable treatments and be carefully painted.

In case steel tubes are used, they are assembled by means of braze welding operations, through MIG (Metal Inert Gas) welding or TIG (Tungsten Inert Gas) welding.

For some years now, the use of bicycle frames made of aluminium has spread. Generally, an aluminium frame is less elastic, but stiffer and lighter than a steel frame. The smaller mechanical resistance of this material forces bicycle manufacturers to use tubes with a larger section and a greater thickness (hence the higher structural stiffness). The type of welding used for this material is TIG welding, or the elements are glued to one another.

Only a few dedicated manufacturers produce tubes made of titanium. These tubes are valuable, very light and have an intermediate elasticity coming between steel and aluminium. Titanium is very resistant and hardly oxidizes, so that it does not require any kind of paint. Though, this material is very expensive and hard to be processed, cut or welded.

Recently, different composite materials, which are usually developed for military needs, started to be used to manufacture bicycle frames. These materials are carbon, magnesium and thermoplastics. Though, these materials are very expensive and require sophisticated technologies and equipments, as well as a great expertise of the manufacturer. They allow manufacturers to optimize the dimensioning of each point of the frame, so as to obtain light structures with a suitable degree of stiffness. These materials are often used for monocoque bicycle frames, namely frames that are built without welding points as one single piece by means of a die.

The methods used to manufactures bicycle frames with these new materials, though, feature high costs and the use of sophisticated equipments.

SUMMARY OF THE INVENTION

Therefore, the object of the present invention is to provide a bicycle frame that is easy to be manufactured and, at the same time, guarantees excellent mechanical resistance properties.

Hence, according to the present invention, a bicycle frame is provided according to Claim 1 or to any of the Claims that directly or indirectly depend on Claim 1.

BRIEF DESCRIPTION OF THE DRAWINGS

The additional features and advantages of the present invention will be best understood upon perusal of the following detailed description of three non-limiting embodiments with reference to the accompanying drawings, wherein.

DETAILED DESCRIPTION OF THE INVENTION

Figure 1:
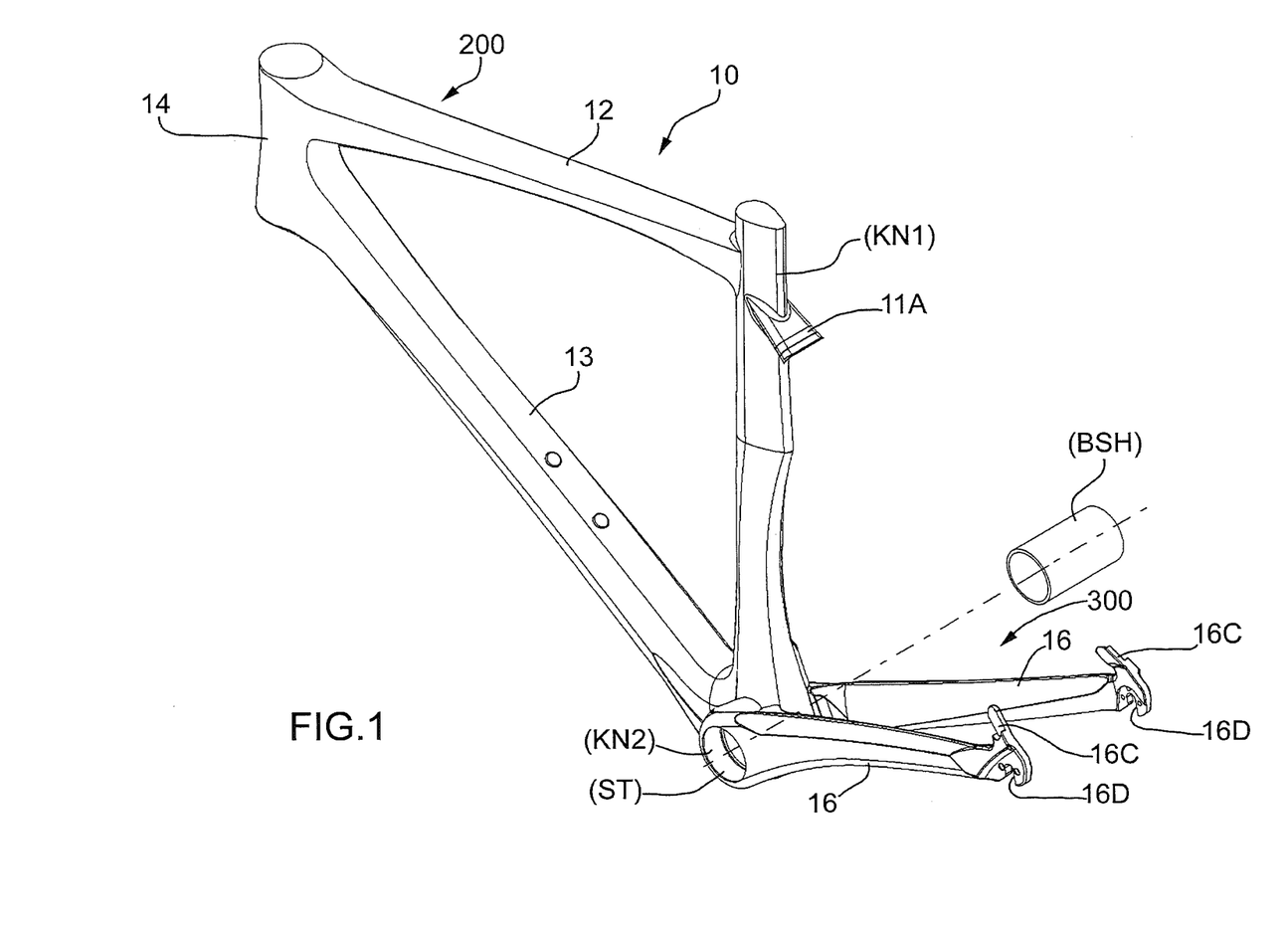
FIG. 1 shows, in a partially exploded view, some details of a bicycle frame according to a first embodiment of the present invention.
Figure 2:
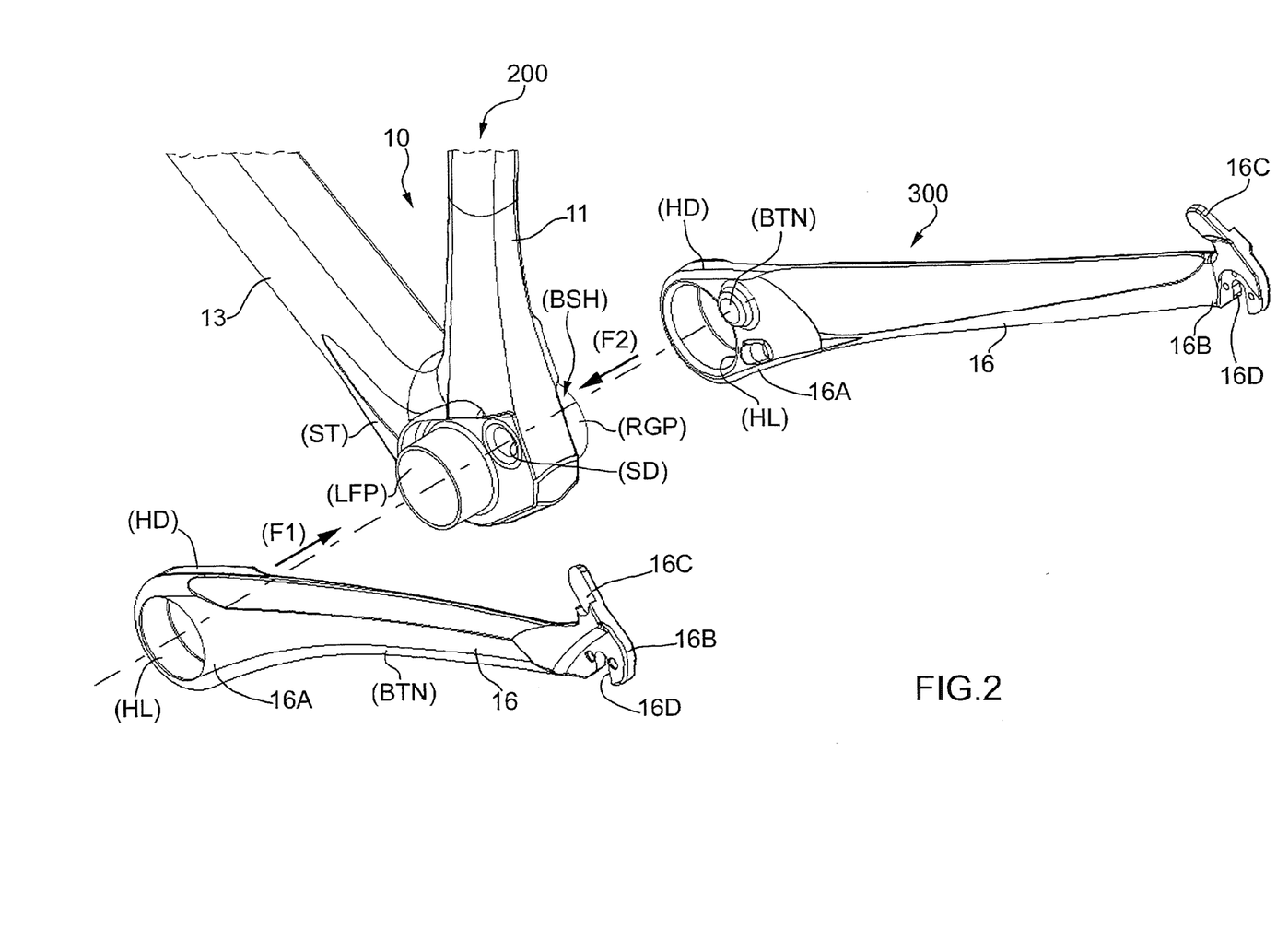
FIG. 2 shows some exploded details of the frame shown on FIG. 1.
Figure 3:
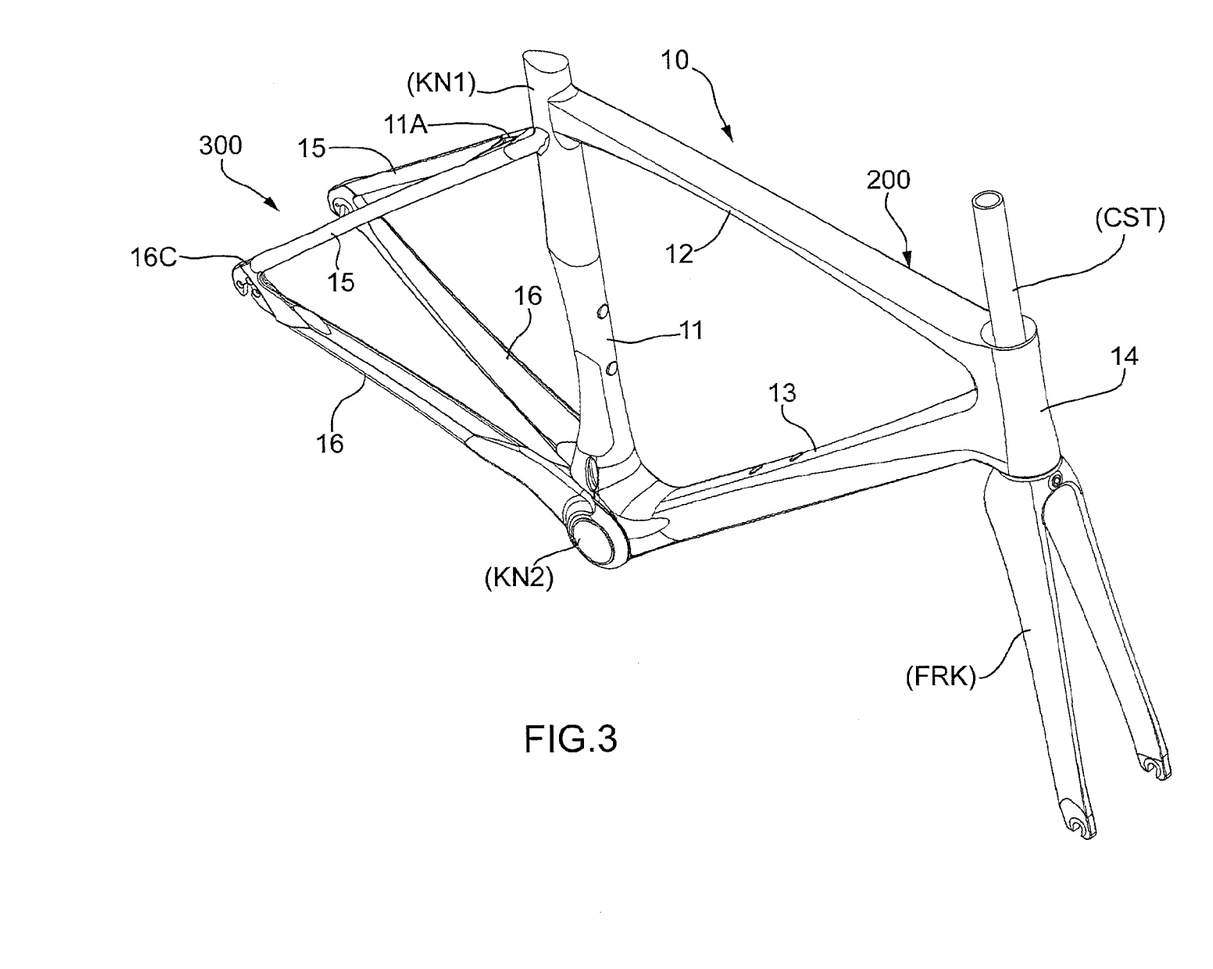
FIG. 3 shows an overall view of the frame shown in FIGS. 1 and 2 in an assembled and complete state; please note the presence, in this figure, of a head tube, which extends downwards with a fork for the front wheel; it is understood that the head tube and the relative fork are not part, in strict sense, of the present frame.

In FIGS. 1, 2 and 3, number 10 indicates, as a whole, a frame for a bicycle (not entirely shown), which comprises a front triangle 200 and a rear triangle 300.

The front triangle 200 comprises, in turn, the following elements:
- a seat tube 11;
- a top tube 12; this tube is almost never perfectly horizontal, but it is more ore less inclined towards the saddle;
- a down tube 13; and
- a steering tube 14.

More in particular:
- the seat tube 11 determines the height of the saddle (not shown) with respect to the ground and connects a seat cluster (KN1) to a bottom bracket axle (KN2);
- the top tube 12 connects the seat cluster (KN1) to the steering tube 14;
- the down tube 13 connects the steering tube 14 to the bottom bracket axle (KN2); it is generally known that this tube is the most subject to stress of the entire frame 10 and, therefore, its section is usually larger than the others; and the steering tube 14 connects the top tube 12 to the down tube 13; it houses a head tube (CST) (FIG. 3), which extends downwards with a fork (FRK) for the front wheel (not shown); the inclination of the steering tube 14 normally ranges from 69° to 72°.

The rear triangle 300 comprises, in turn, two inclined seat stays 15 (FIG. 3), which are rod-shaped, and two horizontal chain stays 16, which, in use, are integral to the seat tube 11 and to the down tube 13 in correspondence to said bottom bracket axle (KN2); furthermore, the two inclined seat stays 15 and the two horizontal chain stays 16 are connected to the rear fork ends, where the rear wheel (not shown) is attached.

In other words, the seat cluster (KN1) is the junction between the seat tube 11, the top tube 12 and the two inclined seat stays 15.

The bottom bracket axle (KN2), in turn, is the junction point between the seat tube 11, the down tube 13 and the two horizontal chain stays 16.

The front triangle 200 is advantageously but not necessarily manufactured as one single piece, for example by means of moulding.

Advantageously, a single upper attachment piece 11A, which is manufactured as one single piece together with the rest of the front triangle 200, projects outwards (for reasons that will be better explained below) from the rear face of said seat tube 11.

A substantially cylindrical through seat (ST) is arranged in correspondence to the bottom bracket axle (KN2) (FIGS. 1, 2).

During the assembly, first of all, a bushing (BSH) is inserted into the through seat (ST). The bushing (BSH) laterally protrudes with respect to the through seat (ST). The two laterally protruding portions of the bushing (BSH) are called (LFP) and (RGP).

Based on the material of which the front triangle 200 and the bushing (BSH) are respectively made, said bushing (BSH) is fixed to the front triangle 200 in the through seat (ST) with known methods, such as, for example, braze welding or glueing.

Then, the two horizontal chain stays 16 are brought close to the bushing (BSH) following the arrows (F1) and (F2). Please note that each horizontal chain stay 16 is shaped as a connecting rod. In correspondence to a first free end 16A of the connecting rod there is arranged a perforated head (HD), whereas in correspondence to a second free end 16B there are arranged a lower attachment piece 16C and a cavity 16D, the latter being suited to house the rear fork ends (not shown), where the rear wheel is attached.

Each perforated head (HD) has a respective circular through hole (HL), which substantially has the same outer diameter as the two protruding portions (LFP), (RGP) of the bushing (BSH).

To this regard, please note that the bushing (BSH) has to be designed so as to be able to house at least part of the mechanisms comprised in the so-called bottom bracket (not shown) of the bicycle (not entirely shown).

If we compare the two assembling systems shown in FIGS. 1 and 2, we can see that, while in the assembling system shown in FIG. 1 the bushing (BSH) is inserted into the through seat (ST) and then the two horizontal chain stays 16 are brought close to the two protruding portions (LFP), (RGP) of the bushing (BSH), in the assembling system adopted in the embodiment of FIG. 2 the two horizontal chain stays 16 are brought close to the front triangle 200 and then the bushing (BSH) is inserted.

Anyway, in both cases, at the end of the assembly the overall configuration shown in FIG. 3 is obtained.

Now the two horizontal chain stays 16 can be fixed to the bushing (BSH) using known methods, such as, for example, braze welding on metals or glueing.

As shown in FIG. 3, after the two horizontal chain stays 16 have been fixed to the bushing (BSH) (hence to the front triangle 200), the upper attachment piece 11A faces the two lower attachment pieces 16C. Therefore, each inclined seat stay 15 only has to be coupled to the two attachment pieces 11A, 16C in order to obtain the rear triangle 300, which, as already mentioned above, is substantially made up of the two inclined seat stays 15 and of the two horizontal chain stays 16.

A person skilled in the art obviously knows that, based on the materials involved, each inclined seat stay 15 can be fixed to the two attachment pieces 11A, 16C using traditional methods, such as, for example, braze welding on metals or glueing.

Furthermore, as shown more in detail in FIG. 2 and for the purpose of improving the way in which each horizontal chain stay 16 is fixed to the rest of the front triangle 200, a respective protruding button (BTN) is provided, which protrudes from each head (HD) (only one protruding button (BTN) is shown in FIG. 2). Each protruding button (BTN), in use, is inserted into a respective seat (SD) (only one seat (SD) is shown in FIG. 2), which is obtained on the outer surface of said seat tube 11.

Figure 4:
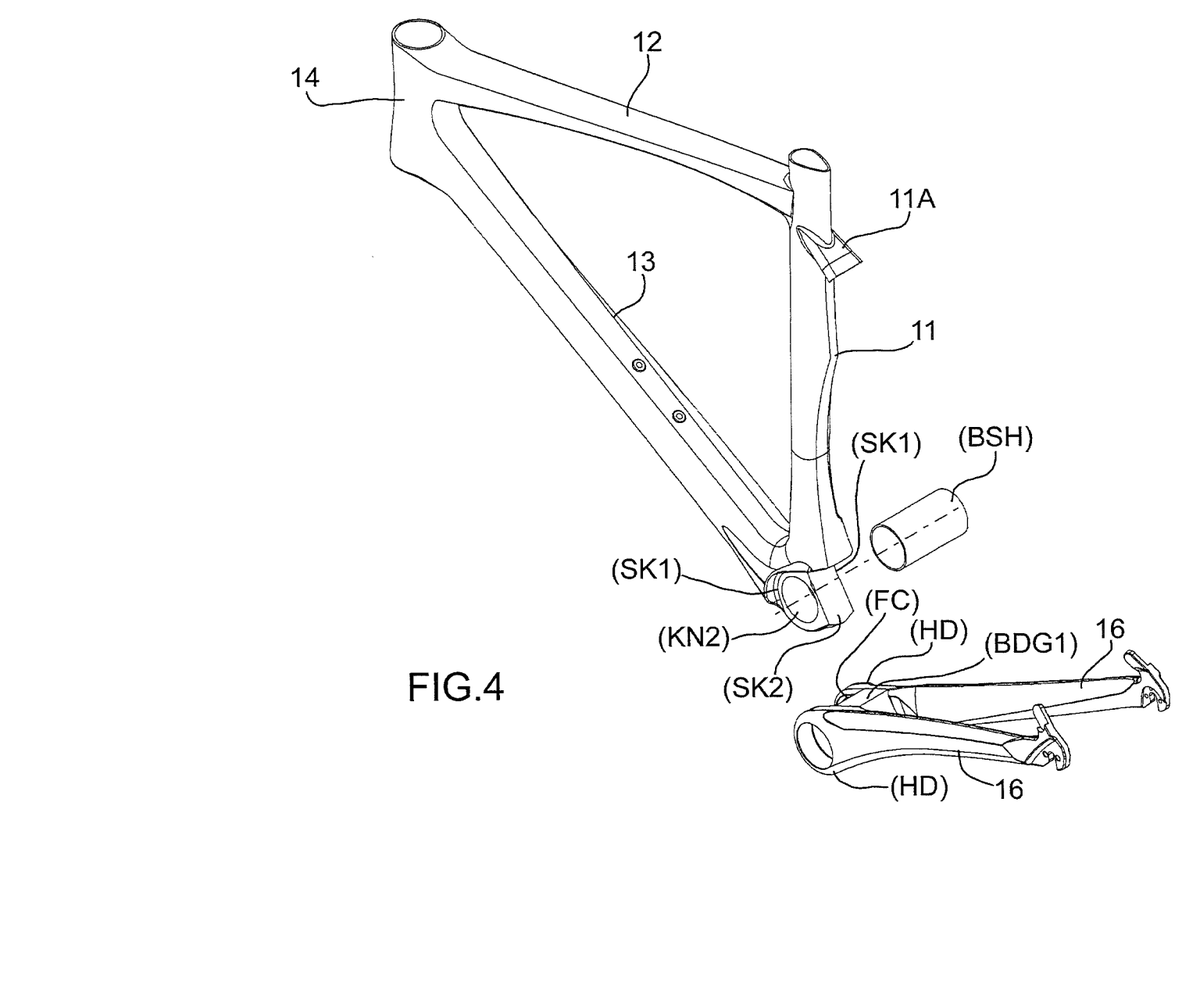
FIG. 4 shows, in a partially exploded view, some details of a bicycle frame according to a second embodiment of the present invention.
Figure 5:
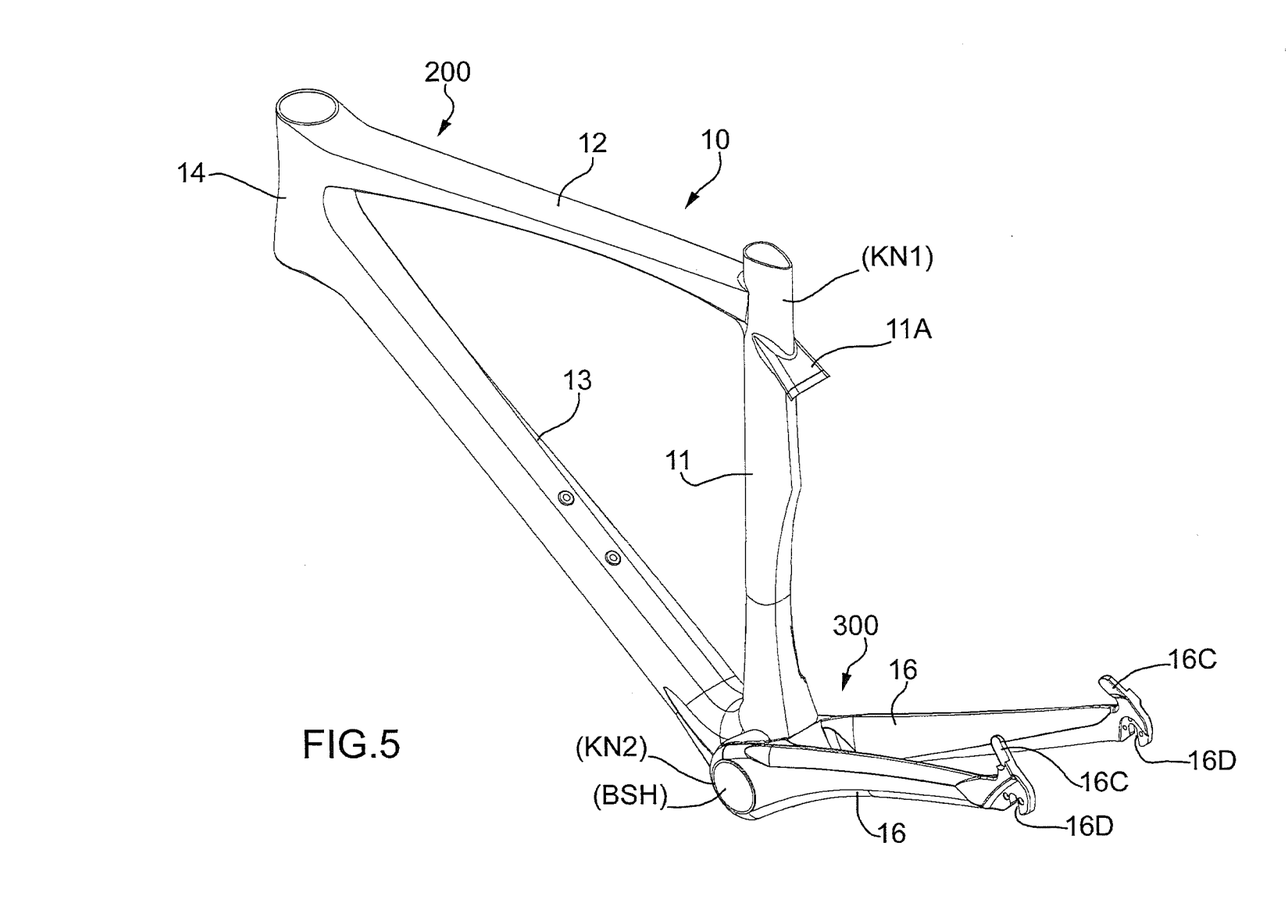
FIG. 5 shows some details of the second embodiment shown in FIG. 4 in an assembled state.
Figure 6:
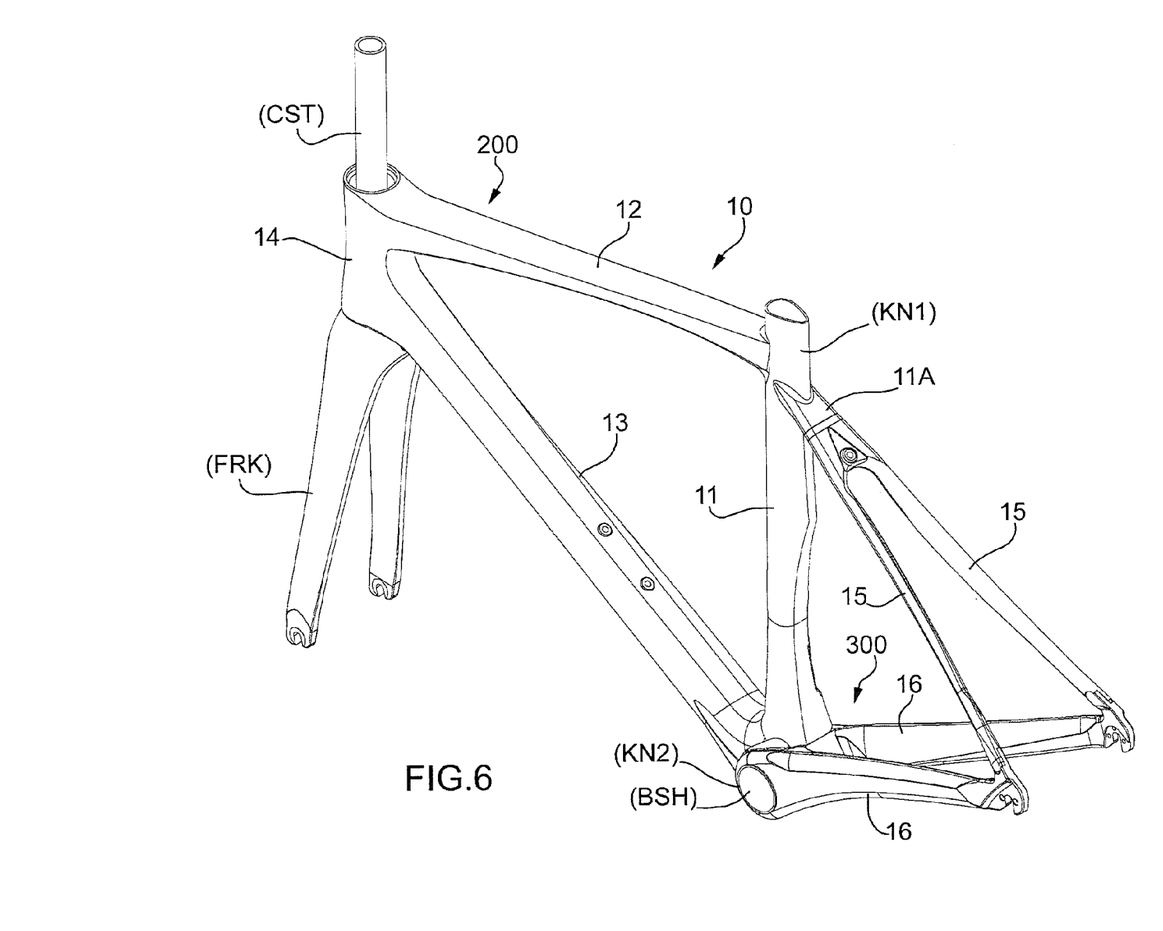
FIG. 6 shows the frame shown in FIGS. 4 and 5 in an assembled and complete state; please note the presence, in this figure, of a head tube, which extends downwards with a fork for the front wheel; it is understood that the head tube and the relative fork are not part, in strict sense, of the present frame.

According to a second embodiment of the present invention shown in FIGS. 4, 5 and 6, where the same elements are indicated with the same numbers and abbreviations of FIGS. 1-3, on the front triangle 200, in correspondence to the bottom bracket axle (KN2), there are two lateral undercuts (SK1) and a front undercut (SK2). Furthermore, the two horizontal chain stays 16 are mechanically connected by means of a rigid bridge (BDG1) (FIG. 4).

During the assembly, in this case, the two lateral undercuts (SK1) are suited to house the respective heads (HD) of the two horizontal chain stays 16, while a front face (FC) of the rigid bridge (BDG1) strikes against the front undercut (SK2). Now the bushing (BSH) can be introduced in the way described with reference to the first embodiment shown in FIGS. 1-3.

The different parts are fixed with the traditional methods.

Figure 7:
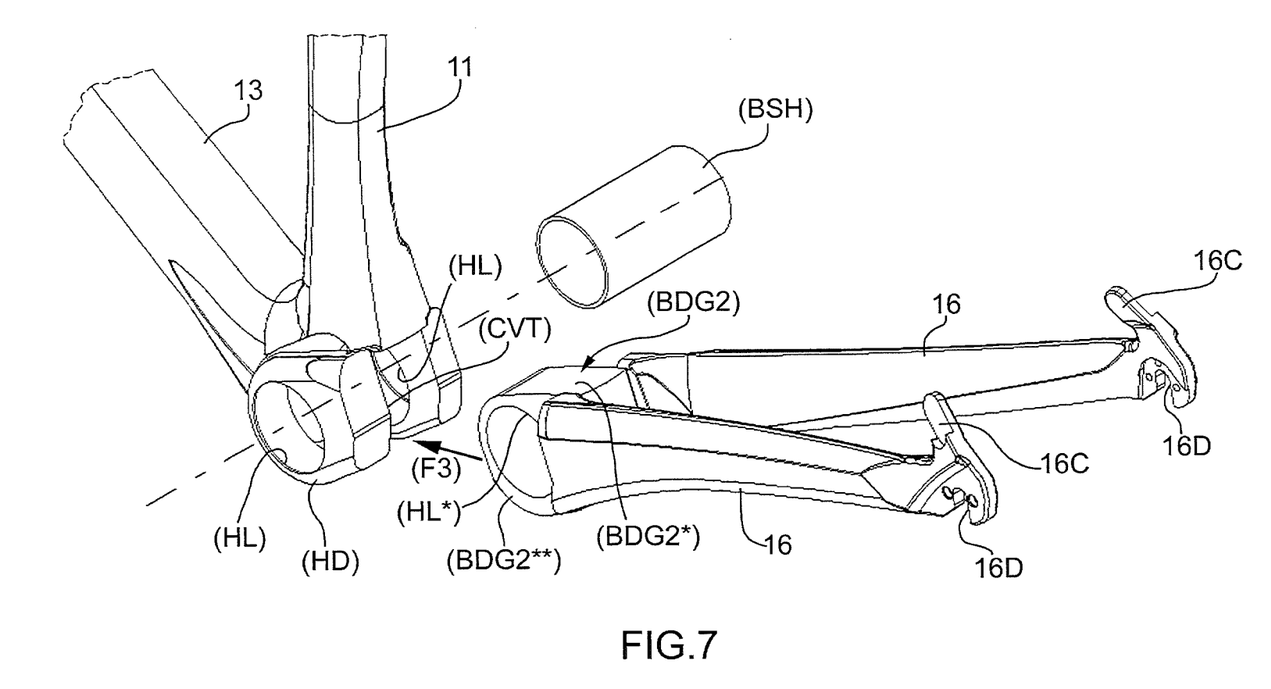
FIG. 7 shows, in an exploded view, some details of a frame according to a third embodiment of the present invention.
Figure 8:
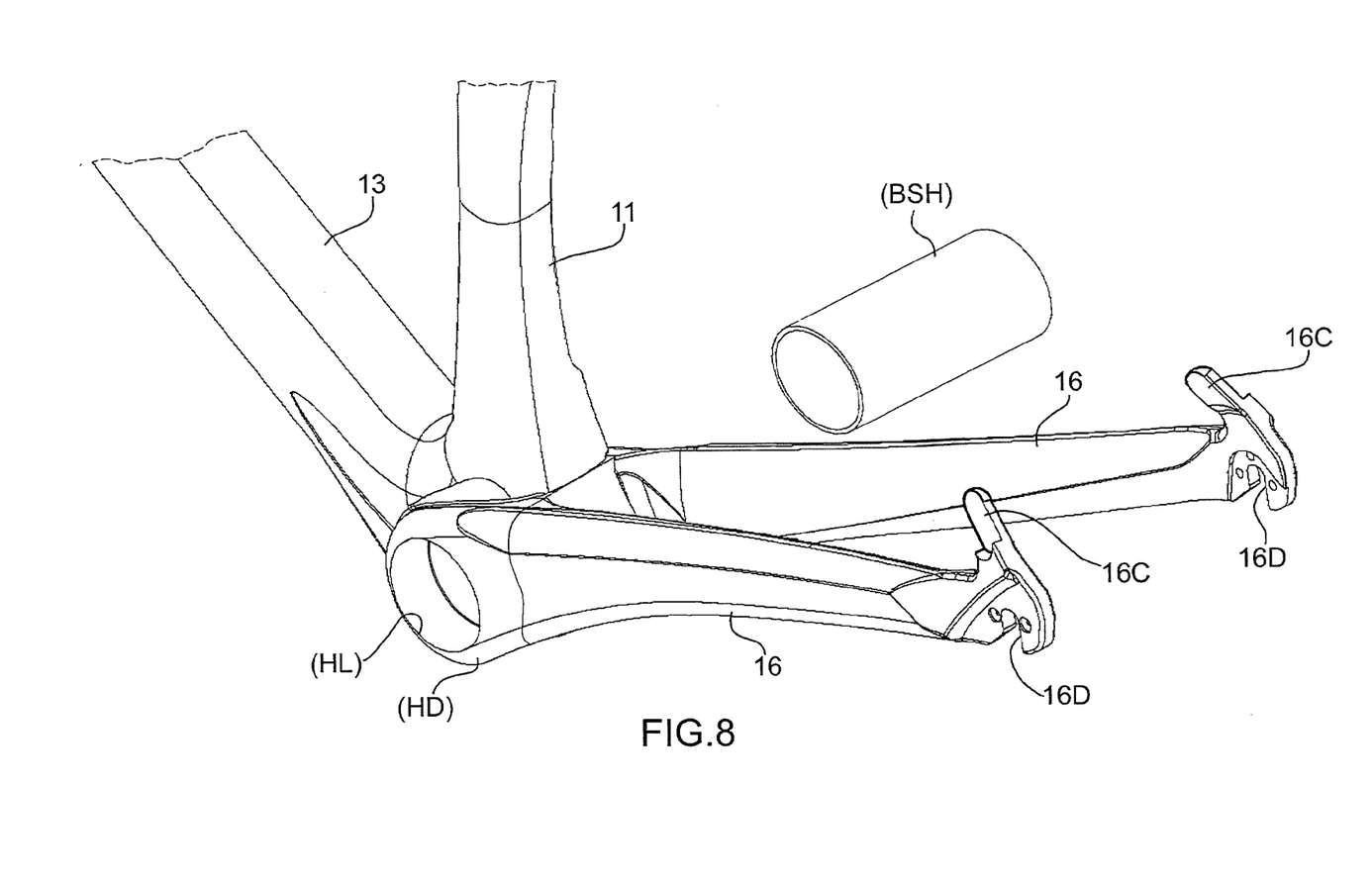
FIG. 8 shows, in a partially exploded view, some details of the frame shown in FIG. 7.
Figure 9:
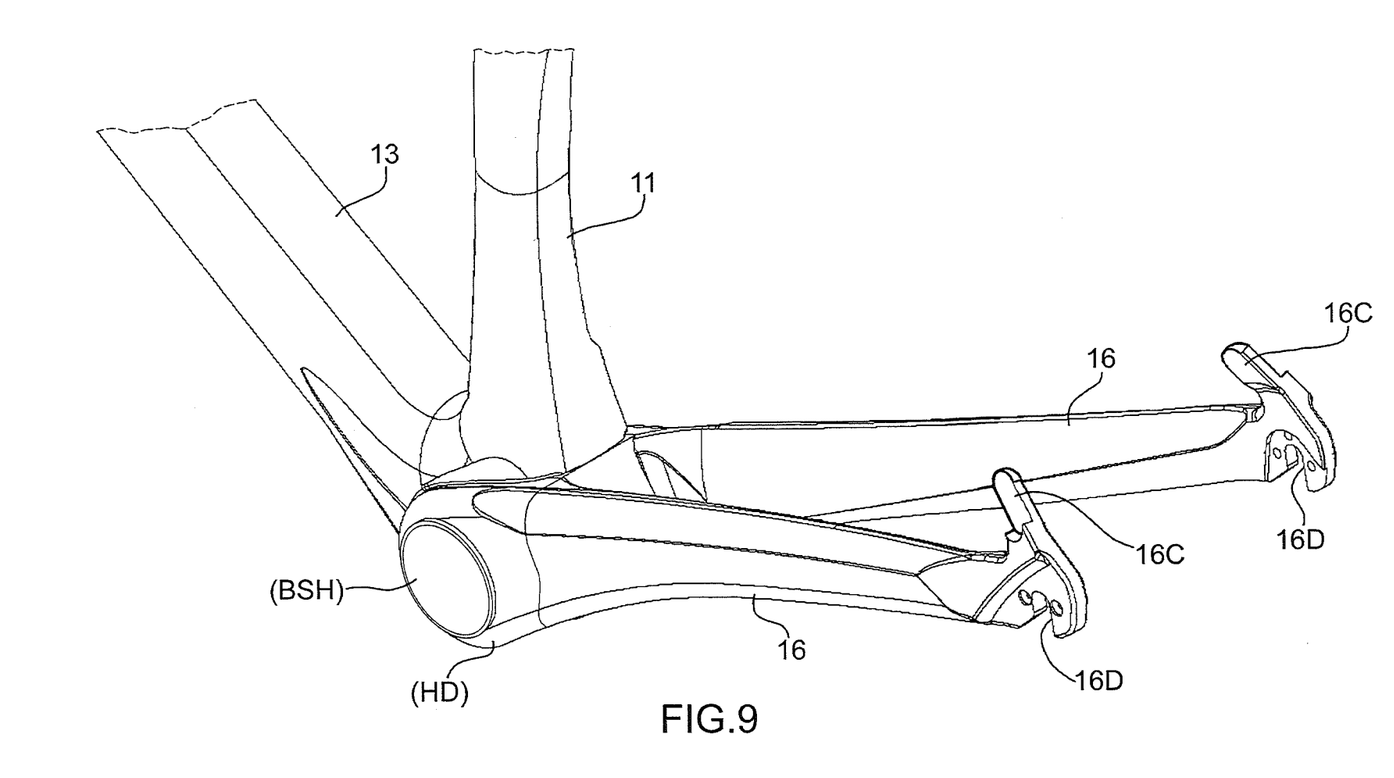
FIG. 9 shows some details of the frame according to the third embodiment shown in FIGS. 7 and 8 in an assembled state.

In a further embodiment of the present invention shown in FIGS. 7, 8 and 9, where the same elements are indicated with the same numbers and abbreviations of FIGS. 1-3 (first embodiment) and of FIGS. 4-6 (second embodiment) respectively, the two heads (HD) of the two horizontal chain stays 16 are manufactured as one single piece together with the front triangle 200, whereas a cavity (CVT) is provided between the two heads (HD).

The two remaining portions of the two horizontal chains stays 16 are mechanically connected to each other by means of a rigid bridge (BDG2) comprising a first polyhedral portion (BDG2*), which continues with a second cylindrical portion (BDG2**) provided with a through hole (HL*).

As shown in detail in FIG. 7, the rigid bridge (BDG2) is inserted into said cavity (CVT), so that the through hole (HL*) is aligned with the through holes (HL) of the heads (HD). After that, as usual, the bushing (BSH) is inserted into the through holes (HL) e (HL*).

The different parts are fixed with the traditional methods described above.

The main advantage of the bicycle frame according to the present invention consists in the fact that its parts can be easily assembled, without jeopardizing the robustness and the reliability of the frame itself.

The invention claimed is:

1. A bicycle frame comprising a front triangle and a rear triangle;
   said front triangle comprising, in turn, the following tubular elements:
   a seat tube;
   a top tube;
   a down tube; and
   a steering tube;
   and said rear triangle comprising, in turn, the following tubular elements:
   two seat stays, which are integral to said seat tube; and
   two chain stays, which are integral to said seat tube and to said down tube in correspondence to a bottom bracket axle;
   the elements in said front triangle are manufactured as one single piece, and said two chain stays are joined to said front triangle by means of a bushing, which is inserted into a seat, which is positioned in correspondence to said bottom bracket axle; said bushing being suited to house a bottom bracket;
   wherein said bushing laterally protrudes with respect to said seat, thus forming two protruding portions,
   each chain stay, which is advantageously shaped as a connecting rod, is arranged beside the respective protruding portion, so that each respective protruding portion is inserted into a respective through hole belonging to a head of each chain stay, and
   wherein each head is provided with at least one protruding button, which is inserted into a respective seat, which is obtained on the outer surface of said seat tube.

2. The frame according to claim 1, wherein a single upper attachment piece, which is manufactured as one single piece with the rest of said front triangle, projects outwards from the rear face of said seat tube.

3. The frame according to claim 1, wherein, in correspondence to a free end of each chain stay, there are a lower attachment piece and a cavity, the latter being suited to house the rear fork ends, where the rear wheel is attached.

4. The frame according to claim 3, wherein said upper attachment piece faces the two lower attachment pieces; said rear triangle being completed by coupling the two free ends of each seat stay to the two attachment pieces.

5. The frame, according to claim 1, wherein the different elements are fitted to each other by means of a method chosen according to the material of which said elements are made, such as braze welding on metals or gluing.

6. A bicycle frame comprising a front triangle and a rear triangle;
   said front triangle comprising, in turn, the following tubular elements:
   a seat tube;
   a top tube;
   a down tube; and
   a steering tube;
   and said rear triangle comprising, in turn, the following tubular elements:
   two seat stays, which are integral to said seat tube; and
   two chain stays, which are integral to said seat tube and to said down tube in correspondence to a bottom bracket axle;
   the elements in said front triangle are manufactured as one single piece, and in that said two chain stays are joined to said front triangle by means of a bushing, which is inserted into a seat, which is positioned in correspondence to said bottom bracket axle; said bushing being suited to house a bottom bracket; and
   wherein on said front triangle, in correspondence to said bottom bracket axle, there are two lateral undercuts and a front undercut; said two chain stays being mechanically connected by means of a rigid bridge.

7. The frame according to claim 6, wherein said two lateral undercuts are suited to house the respective heads of the two chain stays, while a front face of the rigid bridge strikes against said front undercut.

8. A bicycle frame comprising a front triangle and a rear triangle;
   said front triangle comprising, in turn, the following tubular elements:
   a seat tube;
   a top tube;
   a down tube; and
   a steering tube;
   and said rear triangle comprising, in turn, the following tubular elements:
   two seat stays, which are integral to said seat tube; and
   two chain stays, which are integral to said seat tube and to said down tube in correspondence to a bottom bracket axle;
   the elements in said front triangle are manufactured as one single piece, and in that said two chain stays are joined to said front triangle by means of a bushing, which is inserted into a seat, which is positioned in correspondence to said bottom bracket axle; said bushing being suited to house a bottom bracket; wherein
   two heads of said two chain stays are manufactured as one single piece with said front triangle, a cavity being provided between said two heads.

9. The frame according to claim 8, wherein the two remaining portions of the two chains stays are mechanically connected to each other by means of a rigid bridge comprising a first polyhedral portion, which continues with a second cylindrical portion provided with a through hole.

10. The frame according to claim 9, wherein said rigid bridge is inserted into said cavity, so that said through hole is aligned with said through holes of the heads.

* * * * *

UNITED STATES PATENT AND TRADEMARK OFFICE
CERTIFICATE OF CORRECTION

PATENT NO.        : 8,925,949 B2                                  Page 1 of 1
APPLICATION NO.   : 13/887931
DATED             : January 6, 2015
INVENTOR(S)       : Philippe Zecchetto It is certified that error appears in the above-identified patent and that said Letters Patent is hereby corrected as shown below:

On the title page, item 71 change the name of the Applicant's town of residence from Diamant S.r.L., Sorga/Frazione Bonferraro (IT) to Diamant S.r.L., Sorgà/Frazione Bonferraro (IT).

Signed and Sealed this
Twelfth Day of April, 2016

Michelle K. Lee
*Director of the United States Patent and Trademark Office*